J. W. MEAD.

Packing for Condenser-Tubes.

No. 9,001. Reissued Dec. 23, 1879.

*Witnesses:*

Eugene N. Eliot

J. A. Rutherford

*Inventor:*

John W. Mead

By Boyd Eliot

Atty for inventor

N. PETERS, PHOTO-LITHOGRAPHER, WASHINGTON, D. C.

UNITED STATES PATENT OFFICE.

JOHN W. MEAD, OF NEW YORK, N. Y.

IMPROVEMENT IN PACKINGS FOR CONDENSER-TUBES.

Specification forming part of Letters Patent No. 206,813, dated August 6, 1878; Reissue No. 9,001, dated December 23, 1879; application filed November 24, 1879.

*To all whom it may concern:*

Be it known that I, JOHN W. MEAD, of the city, county, and State of New York, have invented certain new and useful Improvements in Packings for Condenser-Tubes and other Surfaces; and I do hereby declare the following to be a full, clear, and exact description of the invention, such as will enable others skilled in the art to which it pertains to make and use it, reference being had to the accompanying drawings, which form part of this specification.

My invention relates to an improved packing for condenser-tubes and other surfaces, the object being to provide a cheap and durable packing, and composed of such material that after the packing has been placed between the surfaces it will swell and make a perfectly tight joint; and to this end my invention consists in a packing composed of layers of wood and paper secured together in any suitable manner by some adhesive substance, as glue, and then formed into the desired size and shape.

Figure 1:
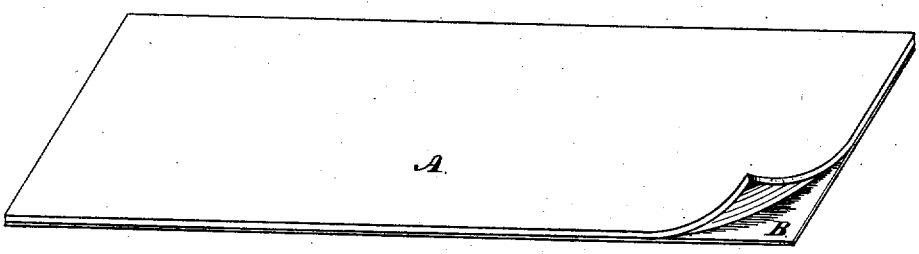
Figure 2:
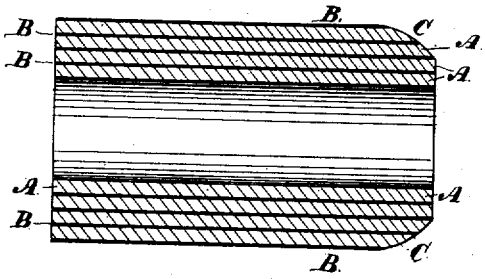
Figure 3:
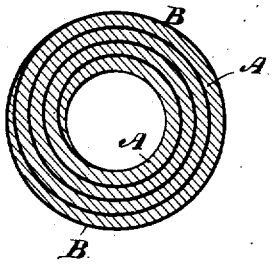
Figure 4:
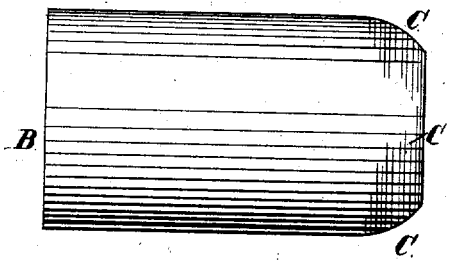

In the accompanying drawings, Figure 1 is a perspective view of the wood and paper strips. Fig. 2 is a horizontal section of a completed packing. Fig. 3 is a transverse section of the same, and Fig. 4 is a side elevation of a packing.

A represents a thin strip or veneer of wood, preferably bass-wood, although other kinds may be employed. To the surface of the strip A is secured the paper strip B, by means of a coating of glue or other adhesive material. The combined wood and paper strip may be made of any desired length, and then wound on a mandrel, the several layers being firmly secured together by a coating of glue or equivalent material, and when the tube or ferrule has been made up to the desired size one end thereof is turned off, as at C, to form a conical end, whereby the packing may be readily inserted into the tube-sheet around the end of a condenser-tube.

Packing formed in this manner and of the material above described possesses many valuable advantages over any other forms of packing yet produced, for the following reasons: The packing, when made up of several layers of wood and paper, possesses great strength, and is not liable to split or splinter when placed in position; second, owing to the fact that the packing is composed of two different kinds of material possessing different characteristics and having their fibers running in different directions, the packing is not liable to become cracked or injured by exposure to the varying changes of climate and the atmosphere; third, this form of packing insures a perfectly tight joint, as the wooden strip, while firm in texture, possesses the quality of swelling and enlarging when exposed to water, and thus the joint is made perfectly tight by means of my improved packing.

It is evident that if such a packing be used between metal surfaces in any other form than for condenser-tubes—as, for example, in the flat form shown in Fig. 1—it will have the same advantages.

Having fully described my invention, what I claim, and desire to secure by Letters Patent, is—

1. As a new article of manufacture, a packing for condenser-tubes and like purposes, composed of alternate layers of wood and paper, combined with some adhesive substance, as and for the purposes set forth.

2. Packing for condenser-tubes and like purposes, consisting of a ferrule or cylinder formed of layers of wood and paper secured to each other in any desired manner, substantially as set forth.

3. A packing for condenser-tubes and equivalent purposes, consisting of thin strips of wood and paper united by glue or equivalent material, and the compound strips then formed into a tube or cylinder of the desired size, the several coils being secured to each other by an interposed coating of glue or equivalent material, substantially as set forth.

JOHN W. MEAD.

Attest:
BOYD ELIOT,
JAMES L. NORRIS.